May 18, 1965

I. O. FIELDGATE 3,184,131

CONTINUOUS TAPE SYSTEM

Filed Aug. 20, 1962

INVENTOR.
IVAN O. FIELDGATE
BY
Douglas M. Clarkson
ATTORNEY 3,184,131
CONTINUOUS TAPE SYSTEM
Ivan O. Fieldgate, Halesite, N.Y., assignor to Potter Instrument Company, Inc., Plainview, N.Y., a corporation of New York
Filed Aug. 20, 1962, Ser. No. 217,903
3 Claims. (Cl. 226—97)

This invention, generally, relates to information processing apparatus and, more particularly, to a continuous tape system for a random access memory apparatus.

It is a principal object of this invention to provide a new and improved tape handler apparatus.

Another object of this invention is to provide a new and improved random access memory apparatus.

Briefly, an information processing apparatus in accordance with the invention includes a tape handler means having an enclosure with means to develop a plurality of loops in an elongated tape which is adapted to store information. An information processing station including transducer means to transfer information is included with the tape handler, and a fluid control means is connected with the enclosure for moving a tape in a preselected one of said loops to said information processing station.

For a more complete understanding of these and other objects of the present invention, reference may be had to the description which follows and to the accompanying drawings, in which.

Figure 1:
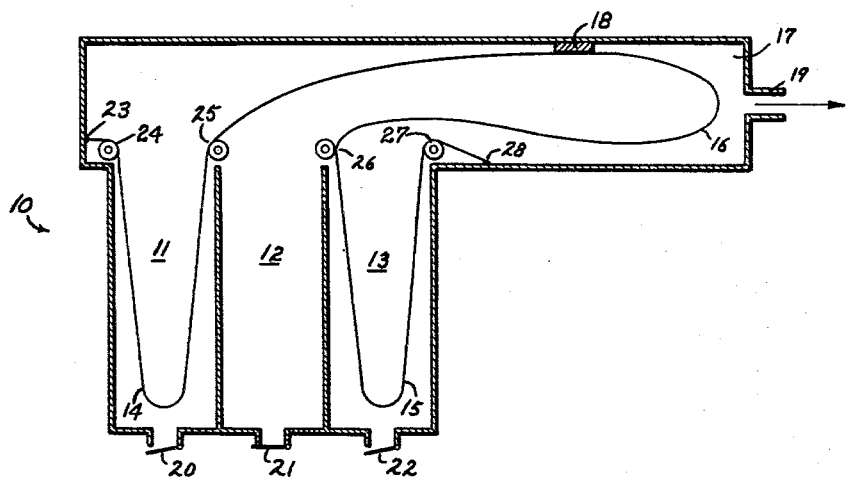
FIG. 1 is a diagrammatically illustrated view of one form of the invention.

Referring now to FIG. 1, a housing 10 is formed to be substantially air tight with a plurality of bins 11, 12 and 13, although it is understood that any number of bins may be used, the invention being not limited to three bins.

Each of the bins 11, 12 and 13 is constructed to receive a loop of tape. For illustrative purposes, the bin 11 is shown with a loop 14, and the bin 13 is shown with a loop 15 therein. The loop of tape normally received in the bin 12 has been withdrawn, as will be explained in greater detail presently, and is identified by the numeral 16 and is shown in a chamber 17 positioned adjacent the bins 11, 12 and 13.

A transducer 18 is positioned suitably at a point somewhat between the chamber 17 and the loop receiving bins 11, 12 and 13. A connection 19 is provided at the furthermost end of the chamber 17 for connecting a suitable source of vacuum, so that the entire chamber 17 within the housing 10 is evacuated.

A valve 20 is provided at the lowermost end of the chamber 11, and a valve 21 is provided similarly with the bin 12. A valve 22 is provided for the bin 13 in a similar manner to the valves 20 and 21, so that one of the tape loops may be selected for drawing into the chamber 17 by operation of an appropriate valve 20, 21 or 22.

The valving action provided by valves 20, 21 and 22 may function in accordance with any desired program, and therefore, be connected appropriately.

At each of the positions identified by the numerals 23, 24, 25, 26, 27 and 28, the tape is clamped or otherwise fixedly attached. Suitable clamping can be either mechanical or pneumatic as desired.

In a random access mode of operation, a tape loop is withdrawn from a particular bin by a variety of means including several programming arrangements referred to above of the valves 20, 21 and 22. One such program would be to apply vacuum continuously at the connection 19 and then open one of the valves 20, 21 and 22. The tape loop in the selected bin then would be transported by the rush of air and read by means of a transducer 18 as the tape is pulled across. After reading the tape loop, the loop is pulled back into the storage bin by releasing the vacuum at connection 19 and applying a vacuum at its appropriate valve, such as valve 21.

Another possible program for selecting the tape loop in a particular bin is as follows. A tape loop may be withdrawn from its storage bin by connecting a suitable source of vacuum to the connection 19 and, at the same time, connecting a vacuum, possibly the same vacuum as that connected with the connection 19, to the gates such as gates 20 and 22. This vacuum maintains the loops 14 and 15 within the bins 11 and 13. However, the gate 21 is closed, and therefore, the vacuum at connection 19 will draw the loop 16 into the chamber 17.

The loop 16 is returned to its storage bin 12 by opening the valve 21 to the vacuum and then discontinuing the application of the vacuum at the connection 19 by closing an appropriate valve, not shown.

Figure 2:
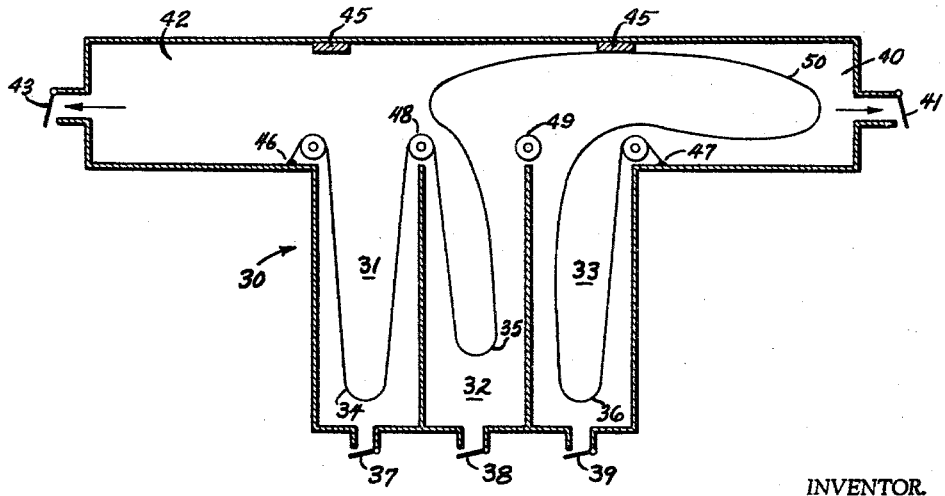
FIG. 2 is a slightly different form of the structure shown in FIG. 1.

Referring now to the form of the invention as shown in FIG. 2, a suitable housing is indicated generally by the numeral 30 as including at least a plurality of bins as illustrated by the three bins 31, 32 and 33 containing tape loops 34, 35 and 36, respectively.

A first chamber 40 is positioned adjacent the plurality of bins and is provided with a valve 41 for controlling the connection to a suitable vacuum source. Another chamber 42 similar to the chamber 40 is provided also adjacent the plurality of bins and has a valve 43 similar to the valve 41.

Transducer heads 44 and 45 are positioned appropriately to read information on the tape as it is moved across in a manner which will be described in greater detail.

In this form of the invention, it is contemplated that the tape will be fixed or fixedly attached only at points 46 and 47. To read the tape in a continuous mode, that is, reading the tape continuously from bin to bin, assume that a suitable vacuum source is connected with each of the valves 37, 38, 39, 41 and 43 and that each of these valves is controlled in a predetermined manner by a suitable programming means.

With all of the valves just mentioned in a closed position and with all of the tape loops in their respective bins, assume that valves 38, 39 and 41 are opened. The tape loops 35 and 36 will be retained in their respective bins due to the vacuum at the valves 38 and 39, respectively. However, the tape loop 34 will be pulled out and toward the chamber 40 in a position across the head 44.

Since the tape in this form of the invention is not fixedly attached at the intermediate points 48 and 49, a portion of the tape loop 35 will be drawn toward the chamber 40. Now, if the valve 43 is opened, a portion of the tape will be drawn toward the chamber 42 and the loop of tape, indicated by the numeral 50 in FIG. 2, will be maintained in the chamber 40 by pulling more tape from the bin 32. It may be necessary to close the valve 38, partially at least, during this operation. As more tape is drawn toward the chamber 42, the bin 32 may be emptied completely and the tape loop in the bin 33 may be drawn upon.

As the tape moves across the heads 44 and 45 and read and ultimately substantially filling the chamber 42, the valve 37 may be opened to begin filling the chamber 31 again. In this manner, the entire tape may be conveyed pneumatically by fluid means from each respective chamber either in sequence or as desired to read the information stored therein.

The following claims are intended to define the valid scope of this invention over the prior art and to cover all changes and modifications falling within the true spirit and valid scope of the invention.

What is claimed is:

1. In an information processing apparatus, a tape handler means comprising, a substantially air-tight enclosure including means to store at least one loop of an elongated tape adapted to store information along a portion of said loop, an information processing station within said enclosure including transducer means to transfer said information, and fluid control means for moving tape in said enclosure to said information processing station, whereby said elongated tape is moved out of said means to store said loop past said information processing station in a predetermined mode of operation when the fluid control means is actuated in accordance with a predetermined schedule.

2. In an information processing apparatus, a tape handler means comprising, a substantially air-tight enclosure including means to store a plurality of storage loops of elongated tape adapted to store information along portions thereof, an information processing station within said enclosure including transducer means to transfer said information supported in a predetermined position within said enclosure relative to the means to store a plurality of loops, means to define a chamber within said enclosure on the opposite side of said information station from said means to store a plurality of loops, and fluid control means for selectively moving one of said loops to said information processing station, whereby an elongated tape is moved past said information processing station in a predetermined mode of operation when the fluid control means is actuated in accordance with a predetermined schedule.

3. In an information processing apparatus, a tape handler means comprising, a substantially air-tight enclosure including means to define a plurality of bins to store loops of tape and at least two chambers at angles to the bins, each of said bins having at one end an unobstructed opening into said chambers, at least one information processing station at a point within said enclosure between the bins and one of the chambers, and an air control valve connected at one end of each bin opposite said unobstructed opening and at an end of each chamber to receive a source of vacuum, whereby an elongated tape is moved in a continuous mode of operation, past the information processing station when the air control valves are opened and closed in accordance with a predetermined schedule.

References Cited by the Examiner

UNITED STATES PATENTS

| 2,892,379 | 6/59 | Cooper | 226—97 X |
| 2,971,267 | 2/61 | Berlyn | 226—97 X |
| 2,995,313 | 8/61 | Namenyi-Karz | 226—97 X |

FOREIGN PATENTS

| 811,609 | 4/59 | Great Britain. |

ROBERT B. REEVES, *Primary Examiner.*

ANDRES H. NIELSEN, RAPHAEL M. LUPO, SAMUEL F. COLEMAN, *Examiners.*